Figure 1:
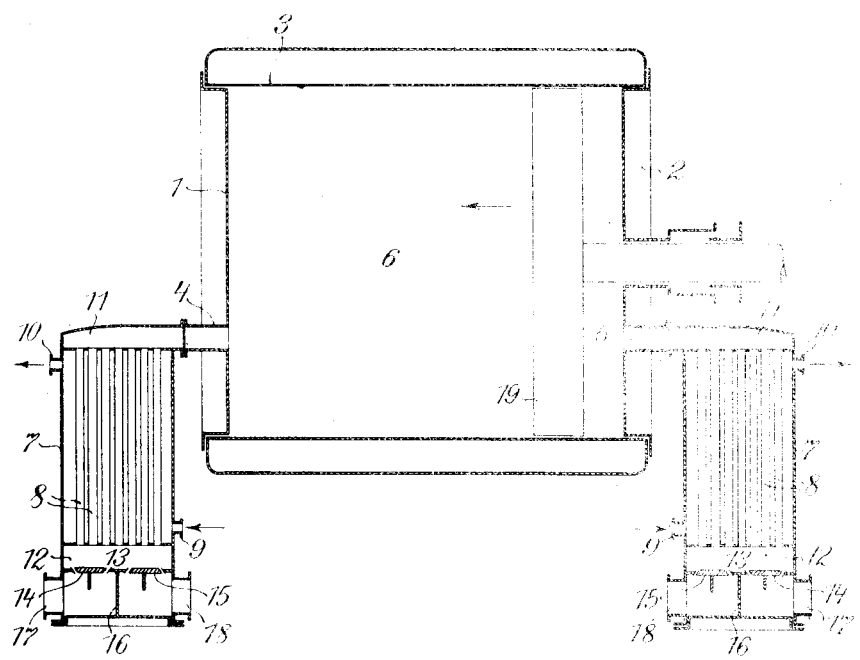

E. W. KÖSTER.
COMPRESSOR.
APPLICATION FILED APR. 28, 1910.

1,062,405.

Patented May 20, 1913.
5 SHEETS—SHEET 1.

Witnesses:
H. B. Younkin
Victor Cumberson

Inventor
Ernst Wilhelm Köster
by John Lotka
Attorney

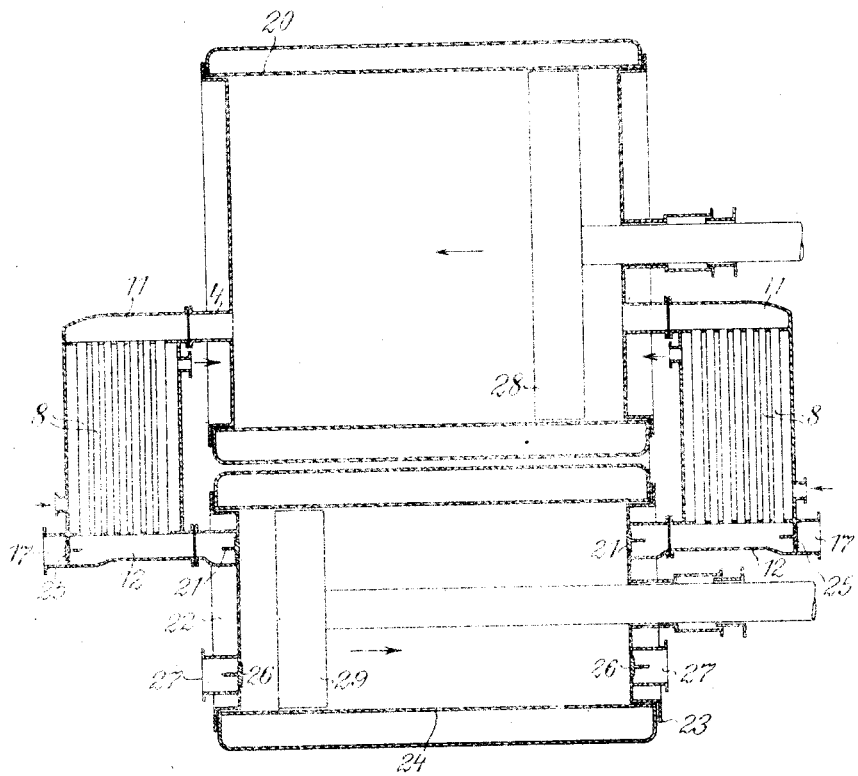

E. W. KÖSTER.
COMPRESSOR.
APPLICATION FILED APR. 26, 1910.

1,062,405.

Patented May 20, 1913.
5 SHEETS—SHEET 3.

Inventor,
Ernst Wilhelm Köster
by John Lotka
Attorney.

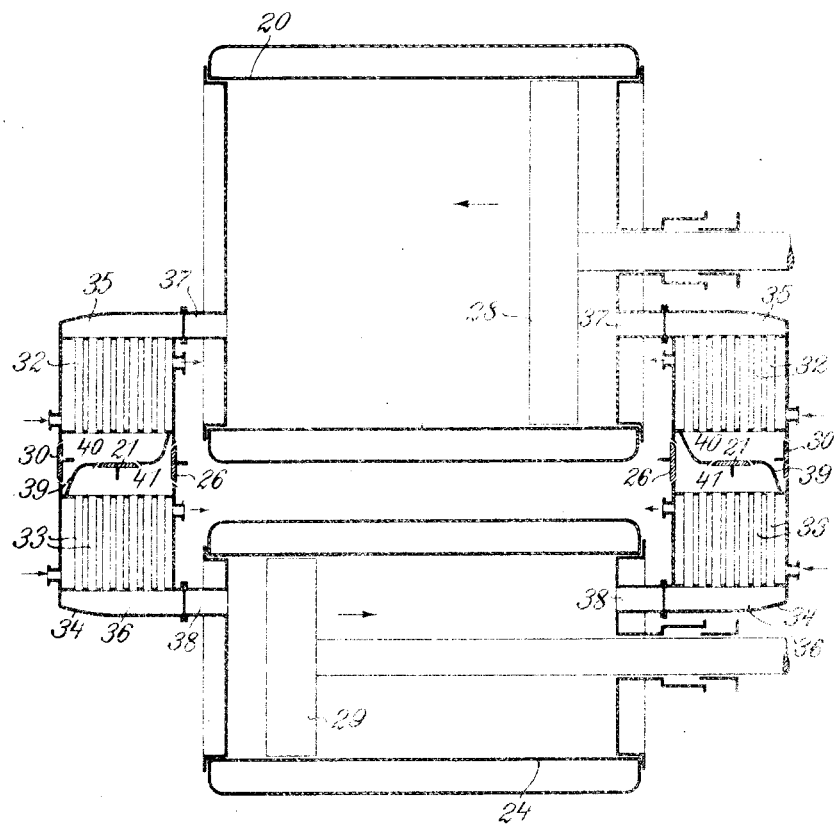

E. W. KÖSTER.
COMPRESSOR.
APPLICATION FILED APR. 26, 1910.

1,062,405.

Patented May 20, 1913.

Witnesses:
H. B. Younkin
Victor Cumberan

Inventor:
Ernst Wilhelm Köster
by
John Locke
Attorney

UNITED STATES PATENT OFFICE.

ERNST WILHELM KÖSTER, OF FRANKFORT-ON-THE-MAIN, GERMANY.

COMPRESSOR.

1,062,403.

Specification of Letters Patent.   Patented May 20, 1913.

Application filed April 26, 1910.   Serial No. 557,750.

*To all whom it may concern:*

Be it known that I, ERNST WILHELM KÖSTER, mechanical engineer, a citizen of the German Empire, and a resident of Frankfort-on-the-Main, in the Kingdom of Prussia, Germany, have invented certain new and useful Improvements in Compressors; and I hereby declare the following to be a full, clear, and exact description of the invention, such as will enable others skilled in the art to which it appertains to make and use the same.

My invention relates to improvements in compressors and more particularly to compressors of that class in which the fluid is compressed by means of a piston which is slidable in a cylinder.

The heat which is produced within the gaseous fluid cylinder of a compressor during the compression stroke of the piston causes an increase in the energy required for operating the compressor, and it is also dangerous for a reliable operation. For this reason, in compressors heretofore in use the cylinder and the head of the compressor were jacketed, and through such jacket a cooling medium was forced. However such cooling means are unsatisfactory, inasmuch as they do not sufficiently abstract the heat from the fluid, because the wall of the cylinder and of the head which are usually made of cast iron must be comparatively thick in order to withstand the considerable pressure required in the compression operation. Therefore the compression is almost diabatic. By subdividing the compressing operation into several steps, and cooling the fluid between successive steps the cooling can be made more effective; but the compression is still adiabatic, because during compression the fluid is not under the influence of the cooling medium.

The object of the improvements is to provide cooling means for the compressor whereby the heat produced during compression is abstracted at the very moment when it is produced. Thereby the compression approaches to a considerable degree the isothermic compression, and for a certain dimension of the cylinder the amount of the fluid drawn in by the piston is increased. For this purpose I provide a cooling body between the cylinder and its elements for controlling the flow of the fluid, or its fluid delivery or suction elements, which cooling means are in constant communication with the cylinder.

For the purpose of explaining the invention several examples embodying the same have been shown in the accompanying drawings in which the same letters of references have been used in all the views to indicate corresponding parts.

Figure 2:
Figure 5:
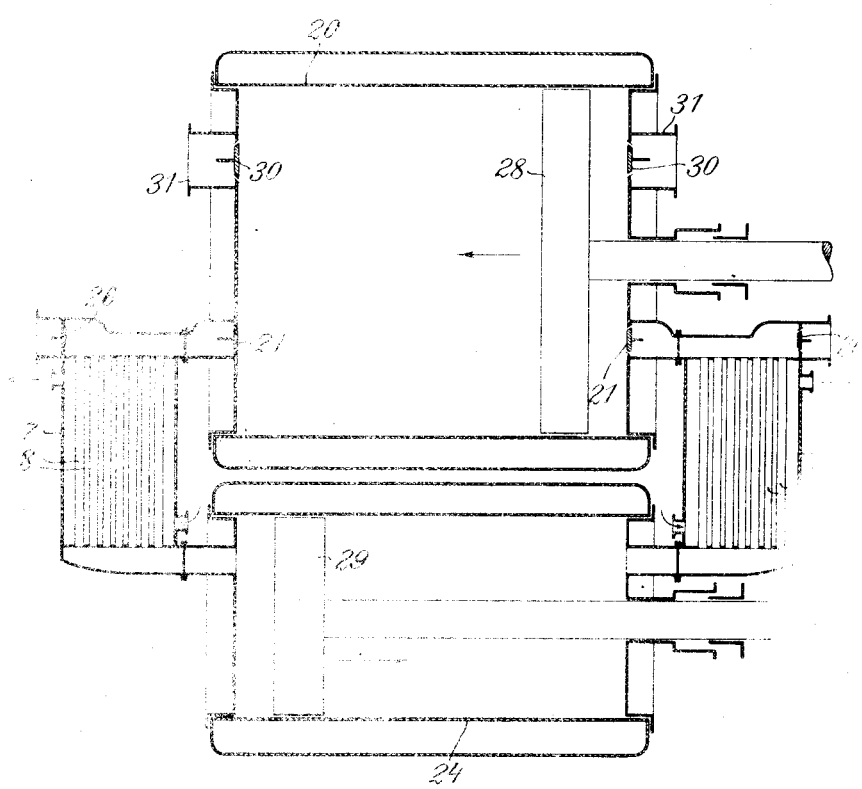
Figure 6:
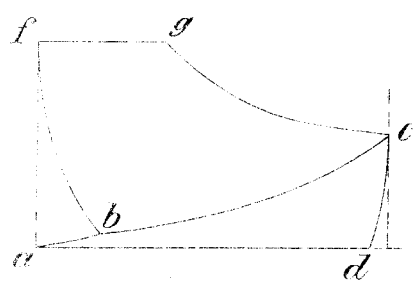
Figure 9:
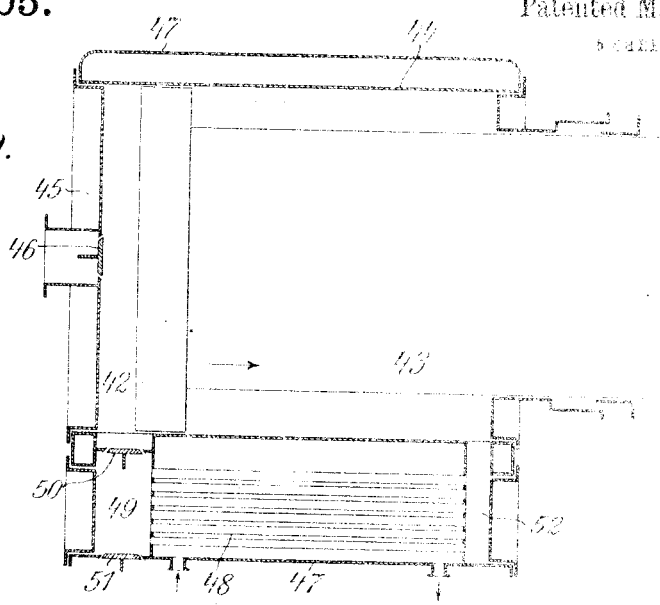
Figure 10:
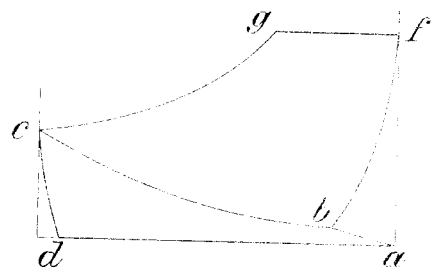
Figure 11:
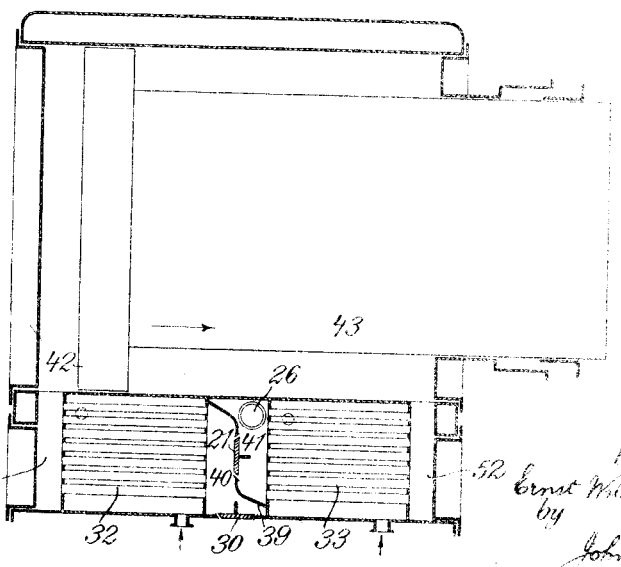

In said drawings—Figure 1, is a diagrammatical cross-section of a compressor embodying the invention, Fig. 2, is the pressure diagram of the compressor illustrated in Fig. 1 and illustrating the reduction in the consumption of the compressor, Fig. 3, is a diagrammatical cross-section of a compound compressor, Fig. 4, is the pressure diagram of the compressor shown in Fig. 3, Fig. 5, is a diagrammatical cross-section showing a modification of the compressor illustrated in Fig. 3, Fig. 6, is the pressure diagram of the compressor shown in Fig. 5, Fig. 7, is a diagrammatic cross-section of a further modification of the compressor shown in Fig. 3, Fig. 8, is the pressure diagram of the compressor shown in Fig. 7, Fig. 9, is a diagrammatical cross-section of a compressor provided with a differential piston, Fig. 10, is the pressure diagram of the compressor shown in Fig. 9 and Fig. 11 is a cross-section of a modified form of the compressor shown in Fig. 9.

Referring to the example illustrated in Fig. 1, a fluid cylinder 3 is provided at both ends with heads 1 and 2, and each of the said heads is formed with a tubular connection 4 and 5 respectively which communicate with the hollow 6 of the cylinder. To each of the said connections a casing 7 is connected which in its upper part incloses the cooler constructed in the form of a stack of cooling tubes 8 communicating with a chamber 11 provided at the upper part of the casing 7. At the lower part of the casing a connection 9 is provided through which a cooling medium, such for example as water, can be forced through the casing and around the tubes 8, and at the upper part of the casing a connection 10 is provided through which the cooling medium is discharged. Through the chamber 11 the tubes communicate with the connections 4 and 5 respectively. At their lower ends the tubes communicate with a chamber 12 which at its bottom 13 is provided with the fluid controlling elements of the cylinder, that is to say the suction valve 14 and the delivery valve 15. By a perpendicular partition 16 the chamber provided below the valves is divided into two sections which by tubular connections 17 and 18 are connected to the suction and delivery conduits respectively of the cylinder of the compressor. The piston 19 of the compressor is constructed in the usual way, and in the example shown the delivery and suction valves 14 and 15 are not provided with governing mechanism. But it will be understood, that valves may be provided which are controlled by a suitable governing mechanism. If for example the piston of the compressor moves from its position shown in the drawing toward the left, the valve 14 at the right hand side of the cylinder is opened by suction and the gaseous fluid passing in through the connection 17 traverses the tubes 8 before being admitted to the cylinder through the connection 5, so that it is cooled. Upon the return stroke of the piston which is represented by the line $a-b$ of the diagram shown in Fig. 2 the fluid which has thus been cooled is compressed, and a considerable part of the fluid is compressed while still being within the cooling tubes 8, so that the heat caused by the compression is immediately transmitted to the cooling medium with which it is removed through the connection 10.

When the fluid has been compressed to the desired pressure, which in the diagram is indicated by the letter $b$, the delivery valve 15 is opened and the fluid is forced out of the cylinder through the connection 18 and the tubes 8. The pressure of the fluid during this part of the stroke of the piston is indicated by the line $b-c$. As the aggregate capacity of the tubes 8 and of the chambers 11 and 12 of the casing 7 represent an increase of the clearance of the cylinder 3, upon the forward stroke of the piston the fluid contained within the said spaces expands according to the line $c-d$, whereupon, at the point represented in the diagram by the letter $d$, the suction valve 14 is opened. The said fluid which has expanded during the forward stroke of the piston has cooled off within the tubes 8 while the direction of the movement of the piston is being reversed, and it is further cooled by expansion. As the compression line $a-b$ of the diagram shown in Fig. 2 is in close proximity to the isothermic line $a-h$ which passes through the point $a$, and the line $a-e$ represents the corresponding adiabatic curve, the surface which is shaded in horizontal lines represents the value of the energy saved by the cooling action of the tubes 8.

By cooling the fluid during its admission to the cylinder, as is represented by the line $d-a$ of the diagram, the volume of the fluid is decreased, so that the piston can draw in a larger amount by weight of the fluid, than it could do if no cooling means were provided. The heat of the compression would also be abstracted if only the delivery valves 15 were arranged as described, and the suction valves were arranged in the usual way, for example within the heads 1 or 2 of the cylinder. It will also be understood, that the invention is not limited to the particular construction of the cooler shown. For example the arrangement may be such that the cooling medium flows through the stack of tubes 8, while the fluid flows around the said tubes.

In Fig. 3 I have shown an example of a cooling apparatus similar to that shown in Fig. 1 and applied to a compound compressor, the said compressor consisting of two cylinders. The low pressure cylinder 20 is provided with cooling means which are arranged in the same way as has been described with reference to Fig. 1, except that its delivery valves 21 are so disposed in the heads 22 and 23 of the high pressure cylinder 24, that they have at the same time the function of the suction valves of the said high pressure cylinder. For this purpose the pressure valves 21 are located in the chambers 12 below the tubes 8 and at the rear of the suction valves 25 of the low pressure cylinder 20. The high pressure cylinder is equipped with delivery valves 26 of its own which as shown are disposed in its heads 22 and 23 and which are connected with the delivery conduit through outlets 27.

If the piston 28 of the low pressure cylinder 20 moves from its position shown in Fig. 3 to the left, the amount of fluid which is still inclosed within the tubes 8 and the chambers 11 and 12 after the last compression stroke is expanded, as is represented by the line $c-d$ of the diagram shown in Fig. 4, whereupon in the position of the piston represented by the point $d$, the suction valve 25 is opened, so that during the part of the suction stroke of the piston 28 which corresponds to the line $d-a$ the fluid is drawn into the cylinder 20 through the tubes 8. Upon the return stroke of the piston 28 the fluid is first compressed within the cylinder 20 and the tubes 8, as is indicated by the line $a-b$ whereupon, at the point $b$, the delivery valve 21 of the low pressure cylinder 24 is opened, because at this point the fluid inclosed within the clearance on the corresponding side of the piston $^{c}$ of the high pressure cylinder 24 has expanded along the line $f-b$ to the pressure of the fluid inclosed within the cylinder 20. While the valve 21 is open further compression of the gas takes place within the low pressure cylinder, the tubes 8, and the high pressure cylinder 20, as is represented by the line b—c, so that during compression according to the line a—c the larger part of the fluid is within the tubes 8.

Upon the return stroke of the piston 29 the fluid is compressed exclusively within the high pressure cylinder, as is indicated by the line c—g. At the point g the pressure valve 26 is opened and the gas is expelled from the pressure cylinder 24 according to the line g—f.

The arrangement of the cooling apparatus shown in Fig. 3 is advantageous because one set of suction valves is dispensed with, while the advantages aimed at by the cooling apparatus are secured.

In the example of the compound compressor shown in Fig. 5 the arrangement shown in Fig. 3 is modified in this respect, that the tubes 8 are disposed between the high pressure cylinder 24 and its suction and delivery valves 21 and 26 respectively, the suction valve having at the same time the function of the delivery valve of the low pressure cylinder 20, and the latter being equipped with suction valves 30 of its own to the chambers 31 of which the suction pipes are connected. By thus including the cooling body between the cylinder of the higher pressure and the suction and delivery valves (21 and 26) of the same the advantage is obtained, that compression takes place in both cylinders under the influence of the cooling body.

The piston 28 of the low pressure cylinder 20 draws in the fluid without making use of the cooling body 8, according to the line c—d—a of the pressure diagram shown in Fig. 6; but during the larger part of the return stroke of the piston the gas is compressed by the low pressure cylinder 28 and during such compression forced through the tubes 8 and into the high pressure cylinder, as is represented by the line b—c of the pressure diagram shown in Fig. 6. In the same way as in the example described with reference to Fig. 3 also in this case almost the whole compression within the low pressure cylinder is effected under the influence of the cooling tubes 8. During the return stroke of the piston 29 in the direction of the arrow the fluid is compressed according to the line c—g and forced into the tubes 8, so that the heat caused by such compression is abstracted by the cooling medium as soon as it is produced. At the point g the delivery valve 26 is opened and the compressed gas is expelled from the high pressure cylinder 24 according to the line g—f.

According to the different arrangements of the cooling apparatus shown in Figs. 3 and 5 the points b and d of the diagram are displaced, whereby the disadvantage resulting from the increase of the clearance is counteracted in a greater or less degree.

In the example of a compound compressor shown in Fig. 7, the valve 21 which is common to both cylinders 20 and 24 is disposed between two cooling bodies 32 and 33, which may be constructed of stacks of tubes, and the arrangement is such that the said valve serves as a delivery valve in the low pressure cylinder 20 and as a suction valve in the high pressure cylinder 24. For this purpose the tubes 32 and 33 are disposed within a common casing 34, and they communicate with one of their ends with chambers 35 or 36 respectively which by tubes 37 and 38 are connected with the low pressure cylinder 20 and the high pressure cylinder 24 respectively. With their opposite ends the tubes 32 and 33 communicate with a chamber located between the same, and divided into two sections 40 and 41 by a partition 39. In the said partition the valve 21 is located, and the section 40 contains the suction valve 30 of the low pressure cylinder, and the section 41 the delivery valve 26 of the high pressure cylinder 24. By thus dividing the cooling body and arranging the gas controlling elements, the gas is under the influence of the cooling body in both cylinders 20 and 24 during its admission to the said cylinders as well as during the compression. Therefore not only the heat produced by compression is satisfactorily removed, but also the temperature at the end of the compression is effectively decreased. The pressure diagram of a compressor arranged as described is shown in Fig. 8.

In Fig. 9 I have shown an example in which my improved cooling system is used in combination with a compressor provided with a differential piston, the section 42 of which belongs to the low pressure side and the section 43 to the high pressure side of the cylinder 44. The head 45 of the cylinder which is opposite to the section 42 of the piston is provided with the suction element 46 for the low pressure side of the cylinder which in the example shown is constructed in the form of a suction valve. The cooling body is arranged parallel to the axis of the cylinder and within an enlarged portion of the jacket 47 of the cylinder, and in the example shown it is in the form of a stack of tubes 48 which at the side of the cylinder which is adjacent to the head 45 communicate with a chamber 49, and in the said chamber at the side of the cylinder the common closing element for the high and low pressure sides of the cylinder is located which is provided by the delivery valve 50 of the low pressure side, and at the opposite end of said chamber the delivery element 51 of the high pressure side is provided. At the opposite end of the cylinder the said stack of tubes communicates with a chamber 52 connected with the high pressure side.

The operation of the compressor is illustrated by the diagram shown in Fig. 10, and it is the same as that described with reference to the compressor shown in Fig. 5.

By properly locating the gas controlling elements the cooling body may be disposed within the head of the cylinder, and the order of the cooling body and the arrangement of the controlling elements may be varied in the manner described with reference to the compound compressors shown in Figs. 3 and 7, so that in each case the cooling body forms a part of the cylinder which is not separated therefrom by a controlling element, as shown for example in Fig. 11.

In compressors of any construction and number of cylinders the cooling body may be arranged within the jackets of the cylinder or its heads.

I claim herein as my invention:

1. In a compressor, the combination with a compression cylinder and a piston arranged to travel in said cylinder to compress fluid therein, of a cooler having a path one end of which has a constantly open communication with said cylinder, and means connected with the other end of said path, for controlling the admission and delivery of the fluid to and from said cylinder, so that the said fluid will travel through the same path of the cooler both on its way to the cylinder and on its passage therefrom.

2. The combination, with a compressor, of a set of tubes having their delivery ends connected with said compressor, a suction valve controlling the admission of uncompressed fluid to the other ends of said tubes, and means for cooling the fluid passing through said tubes.

3. In a compressor, the combination with a structure having chambers for higher and lower pressures, of a gas controlling element interposed between said chambers to simultaneously control the delivery from said chamber of lower pressure and the admission to said chamber of higher pressure, and a cooler comprising two sections constantly communicating with the said chambers of higher and lower pressure respectively, said gas controlling element being located between the sections of said cooler.

4. In a compressor, the combination with a structure having chambers for relatively high and low pressures respectively, of a valve controlling the passage of fluid from the low pressure chamber, a connection from said valve to the high pressure chamber, and a cooler comprising a plurality of tubes connected in parallel and interposed in said connection between the valve and the high pressure chamber and forming part of said connection so that the fluid will pass through the several tubes of the cooler on its way from said valve to the high-pressure chamber, said cooler being in permanently open communication with the high-pressure chamber.

5. In a compressor, the combination with a structure having chambers for relatively high and low pressures respectively, of a valve controlling the passage of fluid from the low-pressure chamber, a connection from the said valve to the high-pressure chamber, a cooler comprising a plurality of tubes connected in parallel and interposed in said connection between the valve and the high-pressure chamber and forming part of said connection so that the fluid will pass through the several tubes of the cooler on its way from said valve to the high-pressure chamber, said cooler being in permanently open communication with the high-pressure chamber, and another valve controlling the delivery of fluid from the high-pressure chamber, said delivery valve being located at the end of the cooler opposite to that which is in permanent communication with the high-pressure chamber, so that the compressed fluid on its way from the high-pressure chamber to said delivery valve, must pass in contact with the cooling surface of the cooler.

In testimony whereof, I have signed this specification in the presence of two subscribing witnesses.

ERNST WILHELM KÖSTER.

Witnesses:
 JEAN GRUND,
 CARL GRUND.